United States Patent [19]
Granau et al.

[11] Patent Number: 5,274,675
[45] Date of Patent: Dec. 28, 1993

[54] METHOD AND APPARATUS FOR POST-CORRELATION SCORING CIRCUIT

[75] Inventors: Robert H. Granau, Tempe; Russell D. Thomas, Chandler; Jeffery S. Chuprun, Scottsdale, all of Ariz.

[73] Assignee: Motorola, Inc., Schaumburg, Ill.

[21] Appl. No.: 850,375

[22] Filed: Mar. 12, 1992

[51] Int. Cl.⁵ .................. H03D 1/00; H04L 27/06
[52] U.S. Cl. .................... 375/96; 342/357; 375/115
[58] Field of Search .............. 375/115, 96, 1; 364/728.03, 724; 370/18, 107, 92; 342/378, 357; 367/38, 39

[56] References Cited

U.S. PATENT DOCUMENTS

| | | | |
|---|---|---|---|
| 3,903,405 | 9/1975 | Gaskill, Jr. ............................ | 235/152 |
| 4,032,885 | 6/1977 | Roth ............................ | 340/146.1 A X |
| 4,255,795 | 3/1981 | Hechtenberg ............................ | 364/728 |
| 4,587,662 | 5/1986 | Langewellpott ............................ | 375/96 X |
| 4,933,952 | 6/1990 | Albrieux et al. ............................ | 375/1 |
| 5,081,645 | 1/1992 | Resnikoff et al. ............................ | 375/96 X |
| 5,157,695 | 10/1992 | Westerfield et al. ............................ | 375/96 |

Primary Examiner—Curtis Kuntz
Assistant Examiner—Tesfaldet Bocure
Attorney, Agent, or Firm—Frederick M. Fliegel

[57] ABSTRACT

An apparatus for post-correlation signal processing includes a plurality of correlators for correlating a received signal with a predetermined signal to produce a plurality of correlator output signals and a selection circuit coupled to the plurality of correlators for selecting a correlator output signal from one of the plurality of correlator output signals to provide a selected correlator output signal. A memory is coupled to the selection circuit for storing post correlation totals. A counter is coupled to the memory for synchronizing the memory with the predetermined signal. An adder is coupled to the memory and to the selection circuit for combining the selected correlator output signal with the post correlation total from the memory to form a new post correlation total. The memory replaces the previous post correlation total with the new post correlation total.

20 Claims, 6 Drawing Sheets

METHOD AND APPARATUS FOR POST-CORRELATION SCORING CIRCUIT

FIELD OF THE INVENTION

This invention relates in general to the field of correlators and in particular to post-correlation integration.

BACKGROUND OF THE INVENTION

Correlation of signal and reference data is important for many electronic products which require an ability to discriminate for coded signals. Examples of such products include global positioning system and geostar receivers, low probability of intercept receivers and other types of secure communications apparatus which rely on code discrimination as a means of signal recognition.

The performance of many such receivers suffers when lack of perfect correlation occurs, resulting in difficulty in synchronizing a reference code generator with a received code or in loss of received data. For example, if a code sequence is used comprising a plurality of bits, corruption of one or more bits is reasonably likely due to received signal fading, transient interference from natural or man-made sources, receiver noise and other causes. It has been especially uneconomical and impractical to digitally process imperfect correlation of a reference code with a received signal in order to allow system operation to proceed despite corruption of the received signal.

Thus, what is needed is a practical, economical method and apparatus for digital recognition of imperfect signal correlation, particularly a method and apparatus allowing system operation in the presence of real-world distortion effects.

SUMMARY OF THE INVENTION

Accordingly, it is an advantage of the present invention to provide a new and improved apparatus for post-correlation signal processing comprising a plurality of correlators for correlating a received signal with a predetermined signal to produce a plurality of correlator output signals and a selection circuit coupled to the plurality of correlators for selecting a correlator output signal from one of the plurality of correlators to provide a selected correlator output signal. A memory is coupled to the selection circuit for storing post correlation totals. A counter is coupled to the memory for synchronizing the memory with the predetermined signal. An adder is coupled to the memory and to the selection circuit for combining the selected correlator output signal with a post correlation total from the memory to form a new post correlation total. The memory replaces the previous post correlation total with the new post correlation total.

A radio desirably includes an apparatus for post correlation signal processing comprising an antenna for receiving input signals and front end circuitry coupled to the antenna. The front end circuitry converts the input signals from analog radio frequency signals to baseband digital signals. Correlation circuitry including a post correlation signal processor is coupled to the front end circuitry. The post correlation circuitry includes a plurality of correlators for correlating a received signal with a predetermined code to provide a plurality of correlator output signals and a selection circuit coupled to the plurality of correlators for selecting a correlator output signal from one of the plurality of correlator output signals to provide a selected correlator output signal. A memory is coupled to the selection circuit for storing data. A counter is coupled to the memory for synchronizing the memory with the predetermined code. An adder is coupled to the memory and to the selection circuit for combining the selected correlator output signal with data from the memory to form a post correlation total which is stored in the memory.

It is a further advantage of the present invention to provide a method for post correlation scoring including the steps of initializing a code phase counter and a memory coupled to the code phase counter by storing zeroes therein, providing a plurality of correlator output signals and selecting a correlator output signal from among the plurality of correlator output signals as a selected correlator output signal. The method further includes the steps of adding the selected correlator output signal to data stored in the memory at a memory location corresponding to a predetermined code phase, to form a post-correlation signal and storing the post correlation signal in the memory at the memory location corresponding to the predetermined code phase. The method further includes scoring the post-correlation signals to determine whether the post-correlation signals comprise a post correlation score. The method includes the step of repeating the steps of providing, selecting, adding, storing, scoring and incrementing until a post correlation score is obtained. The method includes decoding information from the plurality of correlator output signals when a post correlation score is obtained.

The method desirably, but not necessarily, includes the steps of counting a number of correlator output signals exceeding a threshold value and adjusting the threshold value.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 1:
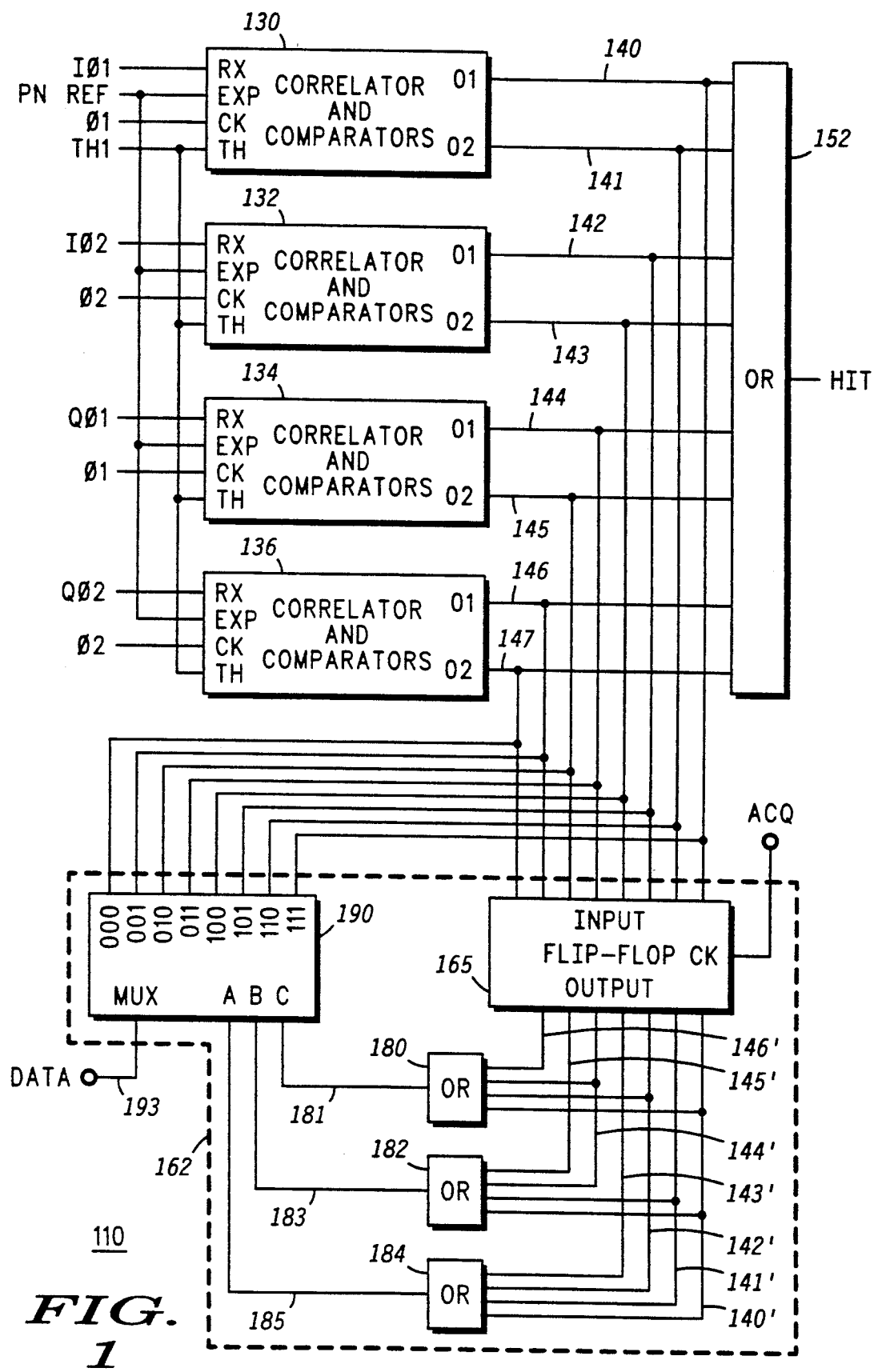
FIG. 1 is a schematic diagram of a circuit in accordance with the present invention.

FIG. 1 is schematic diagram of circuit 110 in accordance with the present invention. Circuit 110 comprises PN (pseudo-noise) reference code input lead PN REF, a first threshold input coupled to buss TH1 and a first clock signal input having a first phase coupled by lead $\phi 1$. Circuit 110 has in-phase (I) input signals coupled by leads I$\phi 1$ and I$\phi 2$ synchronized with a first ($\phi 1$) and a second ($\phi 2$) clock phase, respectively. Circuit 110 also has quadrature (Q) input signals supplied by leads Q$\phi 1$ and Q$\phi 2$ and synchronized with first ($\phi 1$) and second ($\phi 2$) clock signal phases, respectively. Baseband input signals coupled by leads I$\phi 1$, I$\phi 2$, Q$\phi 1$ and Q$\phi 2$ are derived from an antenna and mixing circuit (not shown) in accordance with principles which are well known in the art.

Circuit 110 further comprises correlator and comparator circuits 130, 132, 134 and 136 having inputs RX, EXP, CK and TH. Each of correlator and comparator circuits 130, 132, 134 and 136 produces correlator output signals at outputs 01 and 02. Outputs 01 and 02 are coupled to leads 140 and 141 (correlator and comparator 130), 142 and 143 (correlator and comparator 132), 144 and 145 (correlator and comparator 134) and 146 and 147 (correlator and comparator 136), respectively.

Correlator and comparator output signals supplied by leads 140-147 comprise logical ones or zeros, corresponding to whether the degree of correlation obtained exceeded a first correlation threshold coupled from external circuitry (not shown in FIG. 1) via buss TH1, or not.

Circuit 110 further comprises OR circuit 152 and OR and multiplexer (MUX) circuit 162. OR circuit 152 outputs a logical one if one or more correlations occurred which produced values exceeding the first correlation threshold (buss TH1) in correlation of baseband input signals coupled via leads I$\phi 1$, I$\phi 2$, Q$\phi 1$ and Q$\phi 2$ with the PN reference code stored in correlators 130, 132, 134 and 136. Occurrence of this signal comprises a "hit" or a successful correlation of a received signal with an internally generated PN code supplied to correlators 130, 132, 134 and 136 via lead PN REF.

OR and multiplexer circuit 162 comprises flip-flop 165 having inputs coupled to leads 140-147, a first clock input coupled by lead ACQ to clock input CK and outputs coupled to leads 140', 141', 142', 143', 144', 145' and 146'. OR and multiplexer circuit 162 further comprises OR gates 180, 182 and 184 having inputs coupled to selected ones of leads 140'-146' and outputs coupled by leads 181, 183 and 185 to inputs A, B and C of MUX 190, respectively.

OR gate 180 has inputs coupled to leads 140', 142', 144' and 146'. OR gate 180 determines if the received signal was in- or out-of-phase with respect to the expected PN pattern. OR gate 182 has inputs coupled to leads 140', 141', 144' and 145'. OR gate 182 determines if the received signal transitions on the first clock signal having a first clock phase coupled by lead $\phi 1$ or on the second clock signal having a second clock phase coupled by lead $\phi 2$. OR gate 184 has inputs coupled to leads 140', 141', 142' and 143'. OR gate 184 determines if the in-phase (I) or quadrature (Q) input signal correlated with the reference PN code pattern.

OR and multiplexer circuit 162 further comprises multiplexer 190 having inputs 000-111 coupled to leads 140-147, respectively. OR and multiplexer circuit 162 has DATA output coupled to lead 193.

When the received code phase is acquired, the signal coupled by lead ACQ becomes a logical one and flip-flop 165 couples signals from leads 140-146 to leads 140'-146', respectively. OR block 162 decodes data from a selected one of leads 140, 141, 142, 143, 144, 145, 146 or 147.

Outputs 181, 183 and 185 of OR gates 180, 182 and 184, respectively, are coupled to inputs A, B and C of MUX 190 and one of the signals supplied by leads 140, 141, 142, 143, 144, 145, 146 or 147 is selected by signals coupled via leads A, B and C of MUX 190 and is supplied thereby to MUX output (lead 193). The MUX output signal (lead 193) is either a logical "one" or "zero" and corresponds to data encoded onto the received PN code sequence. Circuit 110 thus functions as a decoder circuit when the received code phase is acquired.

Data are typically encoded onto PN sequences by exclusive-ORing a slowly changing data stream comprising a sequence of logical "ones" and "zeroes" with a much more rapidly changing PN sequence, producing a PN sequence having phase reversals occurring at the data signal transitions. PN sequences having chip rates on the order of, by way of example, ten MegaHertz, are often employed in such systems. The first and second clock signals coupled via leads $\phi 1$ and $\phi 2$ have frequencies closely matched to the PN sequence chip rates.

OR gates 152, 180, 182 and 184 may be implemented as MC74HC32 integrated circuits, flip-flop 165 may be implemented as MC74HC374 integrated circuits and MUX 190 may be implemented as an MC74HC151 integrated circuit, all available from a variety of integrated circuit manufacturers including Motorola, Inc., of Phoenix, AZ.

Figure 2:
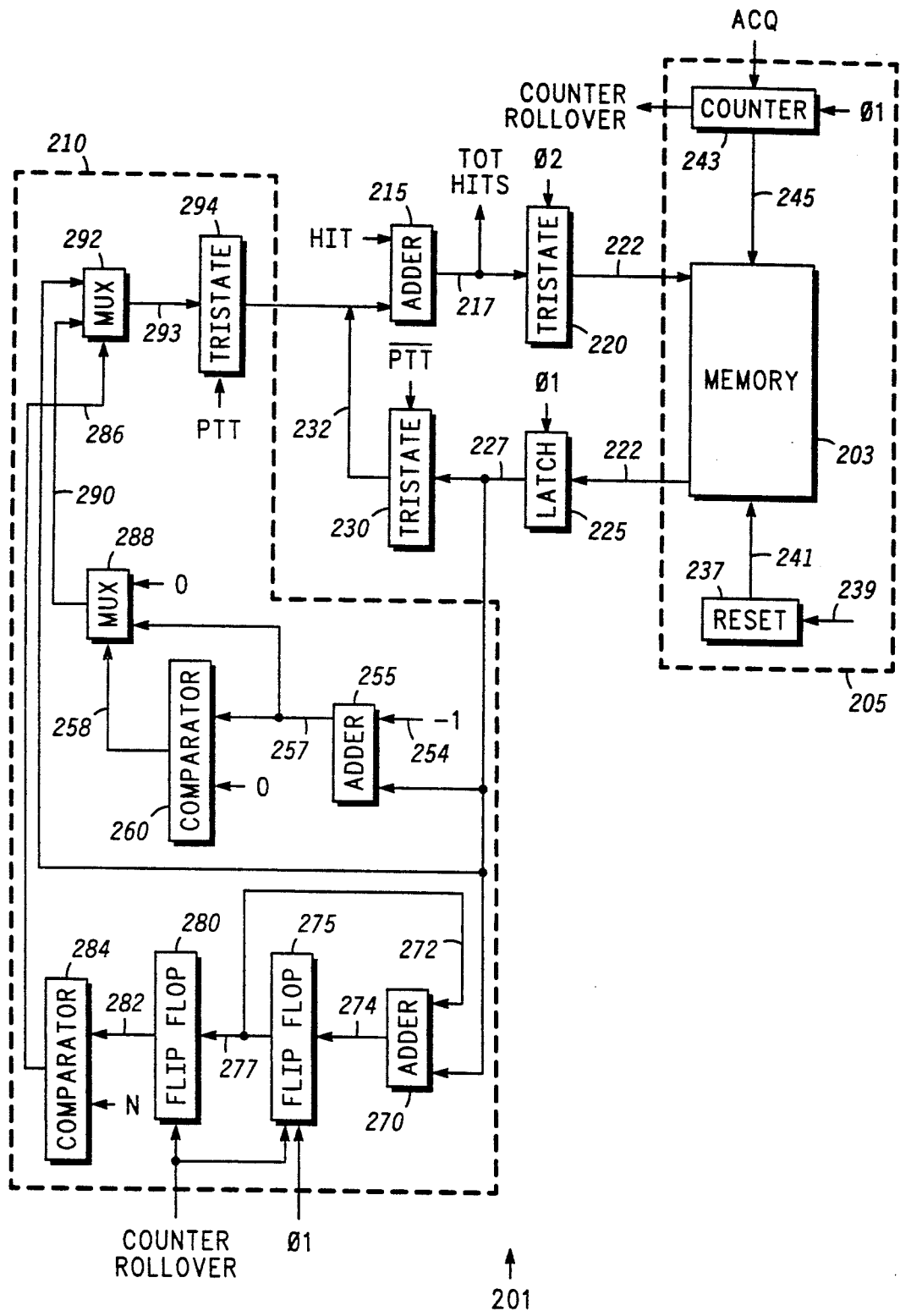
FIG. 2 is a schematic diagram of a post-correlation correlation scoring circuit in accordance with the present invention.

FIG. 2 is a schematic diagram of post-correlation scoring circuit 201 in accordance with the present invention. Post-correlation scoring circuit 201 comprises memory circuit 205, leaky integrator 210, adder 215, latch 225 and tristate buffers 220 and 230, together with busses 217, 222, 227 and 232, output buss TOTHITS and input leads HIT and $\overline{\text{PTT}}$.

A tristate buffer, also known as a tristate, acts as non-inverting buffer circuits providing output signals which are ones or zeroes and have a third or disabled output state wherein the output has a high impedance and is neither a one nor a zero. The high impedance state reduces buss loading, allowing other circuit elements coupled thereto to determine the logical state thereof.

Memory circuit 205 is coupled to latch 225 and tristate buffer 220 via buss 222. Latch 225 has inputs coupled to buss 222 and lead $\phi 1$ and an output coupled to buss 227. Leaky integrator 210 is coupled to tristate buffer 230 and adder 215 via buss 232. Leaky integrator 210 also has a first clocking signal having a first phase, supplied by lead $\phi 1$. Adder 215 has inputs coupled to lead HIT (FIG. 1) and buss 232 and an output coupled to buss 217 (TOTHITS). Tristate buffer 220 is coupled to adder 215 via buss 217 and to lead $\phi 2$, which supplies a second clock signal having a second phase. Tristate buffer 220 is also coupled to memory circuit 205 via buss 222. Tristate buffer 230 is coupled to latch 225 via buss 227, to adder 215 via buss 232 and to lead $\overline{\text{PTT}}$, which supplies an enable signal.

Memory circuit 205 comprises memory 203, leads 239, 241, $\phi 1$, ACQ and COUNTER ROLLOVER, busses 222 and 245, counter 243 and reset circuitry 237. Memory circuit 205 has inputs coupled to busses 222 and 245 and lead 241 and an output coupled to buss 222. Counter 243 has inputs coupled to leads $\phi 1$ and ACQ and outputs coupled to buss 245 and lead COUNTER ROLLOVER. Reset circuitry 237 has a reset input coupled to lead 239 and an output coupled to lead 241.

Leaky integrator 210 comprises tristate buffer 294, MUXs 288 and 292, comparators 260 and 284, leads 254, 258, 286, COUNTER ROLLOVER, PTT and φ1 and busses 0, 227, 232, 257, 272, 274, 277, 282, 290, 293 and N.

Within leaky integrator 210, tristate buffer 294 has inputs coupled to lead PTT and buss 293 and an output coupled to buss 232. MUX 288 has inputs coupled to busses 0 and 257 and lead 258 and an output coupled to buss 290. MUX 292 has inputs coupled to lead 286 and busses 290 and 227 and an output coupled to buss 293. Comparator 260 has inputs coupled to busses 0 and 257 and an output coupled to lead 258. Comparator 284 has inputs coupled to busses 282 and N and Ln output coupled to lead 286.

Leaky integrator 210 further comprises adders 255 and 270 and flip-flops 275 and 280. Adder 255 has inputs coupled to lead 254 and buss 227 and an output coupled to buss 257. Adder 270 has inputs coupled to busses 272 and 227 and an output coupled to buss 274. Flip-flop 275 has inputs coupled to leads φ1 and COUNTER ROLLOVER and buss 274 and an output coupled to buss 277. Flip-flop 280 has inputs coupled to lead COUNTER ROLLOVER and buss 277 and an output coupled to buss 282.

Post-correlation scoring circuit 201 operates in either of two modes, depending on the type of reception desired. A first mode is a continuous mode while a second mode is a push-to-talk (PTT) mode. In either mode, memory circuit 205 is initially set to store zeroes in all memory locations via signals supplied to lead 241 from reset circuitry 237.

Reset circuitry 237 operates before each new code acquisition search to clear all locations in memory 203 in response to external signals coupled via lead 239. After being initialized by storing zeroes in all memory cells, memory 203 cycles through memory cells 0 through N−1 in response to a count from counter 243, which count is supplied to memory 203 via buss 245. The count from counter 243 ranges from 0 to N−1, where N is the length of memory 203 and also of the PN reference code (or code segment thereof) employed. Each memory cell thus corresponds to a particular code phase or bit. In the continuous mode, leaky integrator 210 is disabled by the signal coupled by input lead PTT to tristate buffer 294. In this mode, tristate buffer 230 is enabled in response to signals coupled via input lead $\overline{\text{PTT}}$ (PTT complement) to tristate buffer 230. Data from memory 203 are thus coupled via latch 225, tristate buffer 230 and busses 222, 227 and 232 to adder 215.

When a correlation signal is input (for example, from lead HIT of FIG. 1) to adder 215, the correlation signal (lead HIT) is added to a value from a cell of memory 203 corresponding to the appropriate code phase or bit and the resultant post correlation total is output via buss 217 to tristate buffer 220 and via output buss TOTHITS to external circuitry (not shown in FIG. 2). Tristate buffer 220 is clocked by a second clock signal having a second phase coupled by lead φ1. Latch 225 is clocked by a first clock signal having a first phase coupled by lead φ2, allowing either input to or output from memory 203 via buss 222 as any one time.

The value or post correlation total in the memory cell corresponding to the correct code phase will increase more rapidly than the values stored in other memory cells because the value coupled from lead HIT and added to that cell will be nonzero more often. When the value of the post correlation total supplied to buss 217 reaches a second threshold value, other circuitry (not shown in FIG. 2) causes the signal coupled by lead ACQ to change state. Counter 243 is stopped when this occurs and counter 243 then contains code phase information. Circuit 110 of FIG. 1 then provides decoded data via lead 193.

In the PTT mode, tristate buffer 230 is disabled by the signal coupled by lead $\overline{\text{PTT}}$. Leaky integrator 210 is enabled by the signal coupled by lead PTT which is input to tristate buffer 294. In a PTT system, data are transmitted only at specific times. Noise is received during the intervals when no data are transmitted. Noise will occasionally cause false correlations to occur at random code phases corresponding to random memory cells or locations. This false correlation process causes all locations in memory 203 to store progressively larger values. Leaky integrator 210 allows this effect to be subtracted out.

Adder 270 and flip-flop 275 are interconnected as described hereinabove to form a running total of signals input thereto and are coupled to memory 203 via buss 227. Flip-flop 275 is reset to store zero via lead COUNTER ROLLOVER at each "rollover" of counter 243 (i.e., when counter 243 transitions from N−1 to 0). Adder 270 and flip-flop 275 then sum the post correlation totals stored in all cells of memory 203 during each such cycle. When counter 243 rolls over, the sum stored in flip-flop 275 (representing the sum or running total of the post correlation totals stored in all 0 through N−1 locations of memory 203) is clocked into flip-flop 280. The running total stored in flip-flop 280 is supplied to comparator 284 via buss 282. Comparator 284 compares the value stored in flip-flop 280 (representing the sum or running total) to the memory length N. If the sum is greater than N, each cell or location in memory 203 has (on average) a "hit" stored therein.

In order to remove one "hit" from each memory location without storing a number less than zero in any memory location, leaky integrator 210 routed data from memory 203 to adder 255 via latch 225 and buss 227. Adder 255 subtracts a predetermined number (for example, one) (input via lead 254) from post correlation totals from memory 203 (input via buss 227). A decremented value from adder 255 is input to comparator 260 via buss 257. Comparator 260 compares the decremented value (buss 257) to zero. If the decremented value (buss 257) is less than zero, comparator 260 selects the zero input to MU 288.

Alternatively, if the decremented value (buss 257) is zero or greater, comparator 260 selects the decremented value (buss 257) as input to MU 288. A nonnegative decremented memory value comprising either a decremented value or zero is input to MUX 292 via buss 290. MUX 292 thus has two inputs: the decremented memory value (buss 290), and the memory value or post correlation total (buss 227). If comparator 284 finds the sum in flip-flop 280 to be greater than N, then the select signal (lead 286) selects the decreminted memory value (buss 290). Otherwise, the select signal (lead 286) selects the memory value which is the post correlation total (buss 227). MUX 292 passes the result (a revised post correlation total) to tristate buffer 294 via buss 293. The revised post correlation total is then supplied to memory 203 via adder 215 as described above. This arrangement has the advantage that N need not be a power of two in order for leaky integrator 210 to operate correctly.

Leaky integrator 210 thus allows similar post correlation scoring operation of circuit 201 to occur in the PTT mode as in the continuous mode dispite the presence of false correlations which occur when there is no received signal. These false correlations otherwise cause a cell of memory 203 to eventually accumulate a value triggering a false ACQ signal at an inappropriate code phase. Leaky integrator 210 avoids false code phase acquisition by revising the post correlator totals stored in memory 203 by subtracting out an average from all cells of memory 203 which have false hit data stored therein.

Post-correlation scoring circuit 201 may be implemented by using a Type L6116DC two kilobyte static random access memory circuit from Logic Devices, Inc. of Sunnyvale, CA for memory 203. A Type 74F161 counter integrated circuit available from National Semiconductor of Santa Clara, CA may be employed for counter 243. Type 74HC245 integrated circuits may be used for tristate buffers 220, 230 and 294, a Type MC74HC373 latch integrated circuit may be used for latch 225, Type MC74HC85 integrated circuit may be used for comparators 260 and 284, Type MC74HC157 integrated circuits may be employed for MUX 288 and 292, Type MC74HC374 integrated circuits may be used for flip-flops 275 and 280 and Type MC74HC283 adder integrated circuits may be used for adders 215, 255 and 270, all of which integrated circuits are readily available from a variety of integrated circuit manufacturers, including Motorola, Inc., of Phoenix, AZ.

Figure 3:
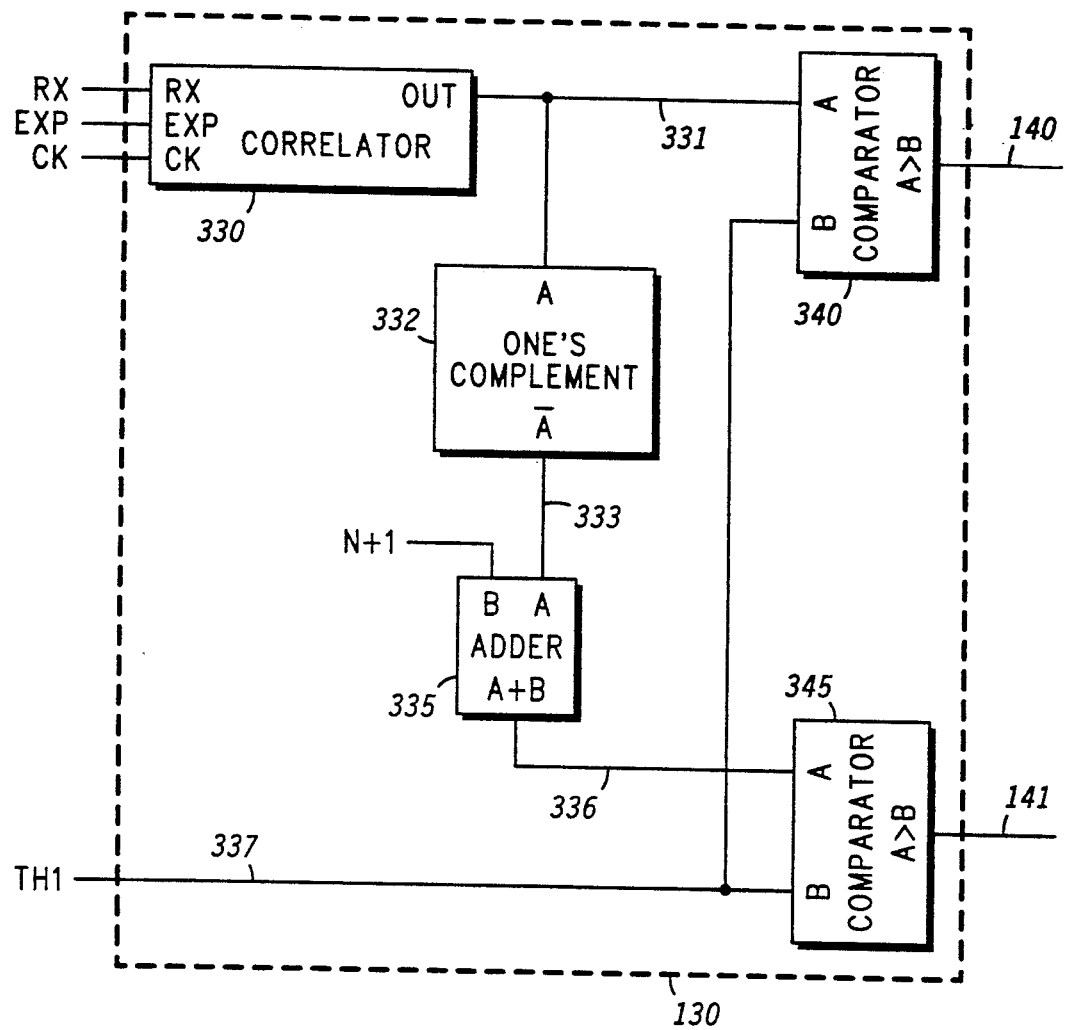
FIG. 3 is a schematic diagram of a correlator and comparator circuit in accordance with the present invention.

FIG. 3 is a schematic diagram of correlation and comparison circuit 130 of FIG. 1, which is representative of correlation and comparison circuits 130, 132, 134 and 136. Correlation and comparison circuit 130 comprises input leads EXP, RX, RK and TH1, output leads 140 and 141, correlator 330, bus inverter circuit 332, adder 335, comparators 340 and 345 and busses 331, 333, 336 and 337.

Bus inverter circuit 332 has inputs A coupled to buss 331 and outputs $\overline{A}$ coupled to inputs A of adder 335 via buss 333. Adder 335 has input A coupled to outputs $\overline{A}$ of bus inverter circuit 332 and B coupled to N+1. Adder 335 has output A+B coupled to bus 336 Comparator 340 has input A coupled to buss 331 and input B coupled to buss 337. Comparator 340 has output A>B coupled to lead 140. Comparator 345 has input A coupled to buss 336 and input B coupled to buss 337. Comparator 345 has output A>B coupled to lead 141.

Correlator 330 is loaded with a PN reference code or code segment via input EXP when correlator circuit 110 and post-correlation scoring circuit 201 are reset. It should be understood that the correlator length and the PN code length need not be the same. For example, the correlator length could be substantially smaller than the PN code length. However, memory 203 must be as long as the PN code length, and input N to comparator 284 (FIG. 2) must be the PN code length. In this example, the correlator would be loaded with a portion of the complete PN sequence employed at the transmitter. A correlation then corresponds to agreement between the reference PN data loaded into the correlator and a portion of the received signal of the same length as the reference PN data loaded into the correlator.

Data supplied to input RX are clocked in response to a first clock signal having a first phase coupled via lead $\phi 1$ to input CK. For example, a value of N supplied by output OUT of correlator 330 corresponds to zero comparison errors or perfect correlation of an N-bit code with an N-bit reference signal coupled via lead PN REF. A value of N−1 on output OUT of correlator 330 corresponds to a single correlation error. A value of N−2 on output OUT of correlator 330 corresponds to two correlation errors, et cetera.

However, if the input data phase supplied to inputs RX of correlators 130, 132, 134 or 136 is only 180° different from that of the PN reference code and no random correlation errors occur, a correlation having N correlation errors results, providing an output signal value of 0 at output OUT of correlator 330. Similarly, a single random correlation error occurring under the circumstances described hereinabove provides an output signal having a value of one at output OUT of correlator 330, et cetera.

To capture correlations corresponding to this situation, the output signal from output OUT of correlator 330 is inverted in bus inverter circuit 332 and is added to N+1 in adder 335 to form the "twos complement" of the value of the output signal (OUT of correlator 330). The "twos complement" output (buss 336) is compared to threshold TH1 coupled by buss 337 in comparator 345. The output signal of output OUT of correlator 330 coupled by buss 331 is also compared to threshold TH1 coupled by buss 337 in comparator 340. The output signals from outputs A>B of comparators 340 and 345 are supplied to leads 140 and 141, respectively. A logical "one" coupled by either of leads 140 and 141 corresponds to a correlation signal from output OUT of correlator 330 or output A+B of adder 335 which exceeded threshold TH1 (buss 337), while logical "zeroes" supplied to leads 140 and/or 141 correspond to output signals from output OUT of correlator 330 or output A+B of adder 335 which did not exceed threshold TH1 (buss 337).

Correlator 330 may be implemented with a Type TMC 2221 correlator integrated circuit available from LSI Products, Inc., of San Diego, CA, a subsidiary of TRW of Los Angeles, CA. Bus inverter circuit 332 may be implemented with 74HC04 integrated circuits, adder 335 may be implemented with a 74HC283 integrated circuit and comparators 340 and 345 may be implemented with Type 74HC85 comparator integrated circuits, available from National Semiconductor of Santa Clara, CA.

Figure 4:
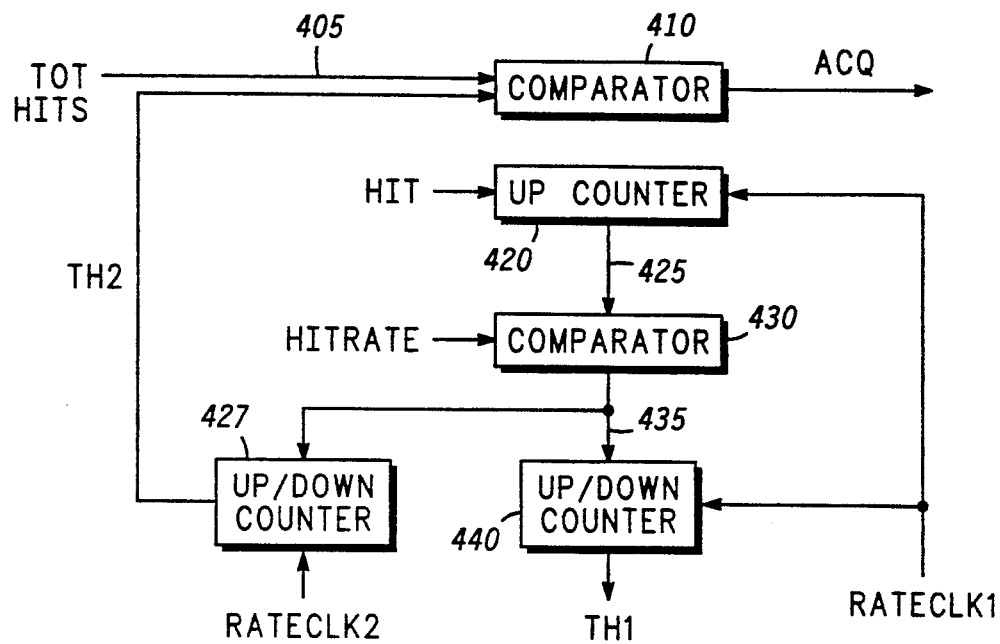
FIG. 4 is a schematic diagram of a constant hit rate circuit in accordance with the present invention.

FIG. 4 is a schematic diagram of constant hit rate circuit 402 in accordance with the present invention. Constant hit rate circuit 402 comprises comparator 410, up counter 420, output lead ACQ, comparator 430, up/down counters 427 and 440, busses 425 and TH2, lead 435, output buss TH1, input busses HITRATE and TOTHITS and input leads HIT, RATECLK1 and RATECLK2.

Comparator 410 has input busses 405 coupled to buss TOTHITS of FIG. 2 and TH2 coupled to the output of up counter 427. Comparator 410 has an output coupled to output lead ACQ. Up counter 420 has inputs coupled to lead HIT of FIG. 1 and to lead RATECLK1, which supplies a clock signal. Up counter 420 has an output which is coupled to comparator 430 via buss 425. Comparator 430 has inputs coupled to busses 425 and HITRATE. Comparator 430 has an output coupled to up/down counters 427 and 440. Buss HITRATE is coupled to external circuitry (not shown) to allow a user-settable "hit" rate to be adjusted. Up/down counter 427 has inputs coupled to lead 435 and to the clocking signal coupled by lead RATECLK2. Up/down counter 427 has an output coupled to buss TH2. Up/down counter 440 has inputs coupled to lead 435 and to the clocking signal coupled by lead RATECLK1. Up/down counter 440 has an output coupled to buss TH1 of FIG. 1.

Comparator 410 determines if the value of the signal supplied to input buss TOTHITS exceeds the value of the acquisition threshold signal supplied to buss TH2. If the value of the signal coupled by input buss TOTHITS exceeds the value of the signal coupled by buss TH2, acquisition is declared and the value of the signal supplied to lead ACQ is set to a logical one. At the start of the acquisition search, up counter 420 is reset to zero and up/down counters 427 and 440 are set to user-selectable initial values via external circuitry (not shown). Each hit signal supplied by lead HIT increments the count stored in up counter 420, which count represents the number of hits having occurred since the most recent reset signal (lead 239 of FIG. 2). The number of hits is accumulated in up counter 420 and is compared to the value of the signal supplied by input buss HITRATE to comparator 430. The value of the signal supplied by input buss HITRATE is user selectable via external circuitry (not shown).

The next rising edge of the (user supplied) clock signal supplied by lead RATECLK1 clocks up/down counter 440, and comparator 430 causes up/down counter 440 to either increment or decrement the first threshold value (buss TH1). If the number of hits stored in up counter 420 is greater than the value of the signal supplied by input buss HITRATE, comparator 430 selects an up count and up/down counter 440 increments the first threshold value (buss TH1) in response to the clock signal supplied by lead RATECLK1. Alternatively, if the number of hits stored in up counter 420 is less than the value of the signal supplied by input buss HITRATE, comparator 430 selects a down count and up/down counter 440 decrements the first threshold value (buss TH1) in response to the clock signal supplied by lead RATECLK1.

Similarly, the next rising edge of the (user supplied) clock signal supplied by lead RATECLK2 clocks up/down counter 427, and the value thereof is set by comparator 430 output coupled to lead 435 to cause counter 427 to either increment or decrement. If the value stored in up counter 420 is greater than the value of the signal supplied by input buss HITRATE, comparator 430 selects an up count and up/down counter 427 increments the second threshold value (buss TH2) in response to the clock signal supplied by lead RATECLK2. Alternatively, if the number of hits stored in up counter 420 is less than the value of the signal supplied by input buss HITRATE, comparator 430 selects a down count and up/down counter 427 decrements the second threshold value (buss TH2) in response to the clock signal supplied by lead RATECLK2.

Use of independent, user-supplied clocking signals coupled by leads RATECLK1 and RATECLK2 allows the user to update the first and second threshold values, coupled by busses TH1 and TH2, independently. A single clocking signal can be supplied to both RATECLK1 and RATECLK2 input leads if this flexibility is not required.

The first threshold (TH1) is desirably initially set to a value between N/2 and N and is preferably initially set to a value between fifty five and seventy percent of N.

The second threshold (TH2) is desirably initially set to a value between five and ten, to allow several complete searches through the entire PN code before declaring code phase acquisition. The clocking signal supplied by lead RATECLK1 is, by way of example, desirably set to a frequency of a few Hertz and is desirably at least several times the frequency of the clocking signal supplied by lead RATECLK2.

Constant hit rate circuit 402 thus adjusts first and second threshold signals (busses TH1 and TH2) in response to comparison of the measured frequency of hits (lead HIT) and a desired hit rate (buss HITRATE). Buss TH1 is coupled to correlator and comparator circuits 130, 132, 134 and 136 of FIG. 1 and correlator 330 of FIG. 3. These elements compare a first threshold value (buss TH1) to correlation values from received signals to determine if the received signal is correlating with the PN reference code.

The first threshold value (buss TH1) is increased or decreased in response to the measured hit rate to maintain a desired hit rate despite changes in received signal signal-to-noise ratio, et cetera. Similarly, a second threshold value (buss TH2) is adjusted to allow a variable threshold for determining when the data from a given cell of memory 203 comprise code phase acquisition. A signal is generated (lead ACQ) when code phase acquisition is declared, causing circuits 110 and 201 to switch from code phase searching to data decoding.

Comparators 410 and 430 may be implemented with Type 74HC85 integrated circuits. Up counter 420 may be implemented with a Type 74HC161 integrated circuit. Up/down counters 427 and 440 may be implemented with Type 74HC191 integrated circuits. All of these integrated circuits are available from a number of integrated circuit manufacturers, including National Semiconductor of Santa Clara, CA.

Figure 5:
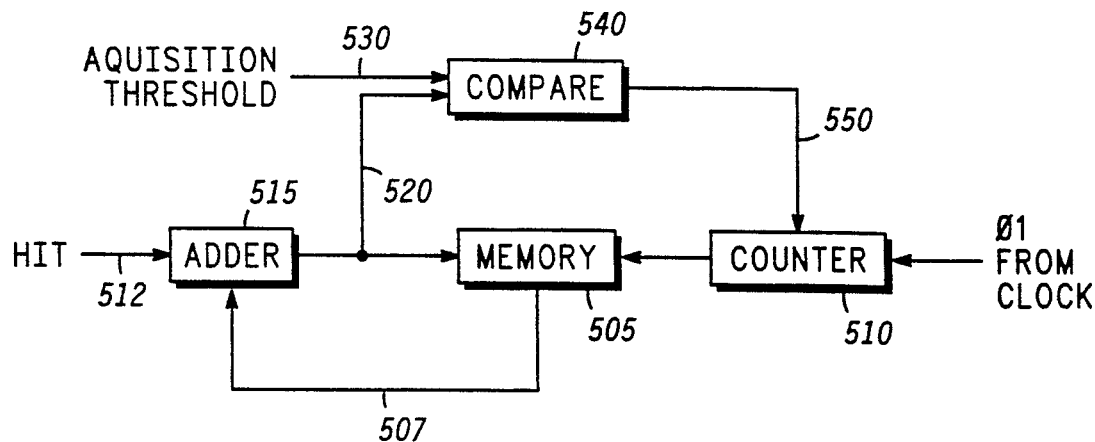
FIG. 5 is a schematic diagram of a simplified post-correlation scoring circuit in accordance with the present invention.

FIG. 5 is a schematic diagram of a simplified post-correlation scoring circuit 502 in accordance with the present invention. Simplified scoring circuit 502 comprises memory 505, memory output coupled to lead 507, counter 510 having a clock input coupled to lead $\phi 1$ and a data input coupled to lead 512, adder 515 having an output coupled to lead 520, an ACQUISITION THRESHOLD input coupled to comparator 540 via lead 530, and comparator 540 output coupled to lead 550.

Memory 505 of simplified scoring circuit 502 is arranged to store data representing N many code chips sequentially such that counter 510 (counter 243 of FIG. 2) causes memory 505 to cycle through N many code chip locations at a rate equal to the rate at which a PN code is transmitted. Each cell in memory 505 thus corresponds to a particular chip, code phase or location in a code. Hit data (lead 512) describe whether or not correlation values exceeded a first threshold value (buss TH1 of FIG. 1).

Signals comprising data coupled by lead 512 (HIT of FIG. 1) are added by adder 515 (adder 215 of FIG. 1) to data accumulated in that memory cell corresponding to the code chip and are output from adder 515 (lead 520, TOTHITS of FIG. 4). An output signal from adder 515 (lead 520) is compared to the ACQUISITION THRESHOLD (TH2 of FIG. 4) value of the signal supplied by lead 530 to comparator 540 (comparator 410 of FIG. 4) and adder 515 output data (lead 520) are entered into a corresponding memory cell of memory 505 (memory 203 of FIG. 2).

When the value of the signals supplied to lead 520 exceed the ACQUISITION THRESHOLD (TH2) value of the signal supplied by lead 530, comparator 540 stops counter 510 via a signal coupled via lead 550 and also causes an ACQ LOCK signal supplied to lead 550 (ACQ of FIG. 4) to change state, signifying that code acquisition has occurred. Counter 510 then contains code phase information.

Comparator 540 may be implemented with a Type 74HC85 comparator integrated circuit and counter 510 may be implemented with a Type 74F161 integrated circuit, both of which are available from National Semiconductor of Santa Clara, CA. Adder 515 may be implemented with a Type MC74HC283 integrated circuit available from Motorola, Inc., of Phoenix, AZ. Memory 505 may be implemented with a Type L6116DC two kilobyte static random access memory circuit from Logic Devices, Inc., of Sunnyvale, CA.

Figure 6:
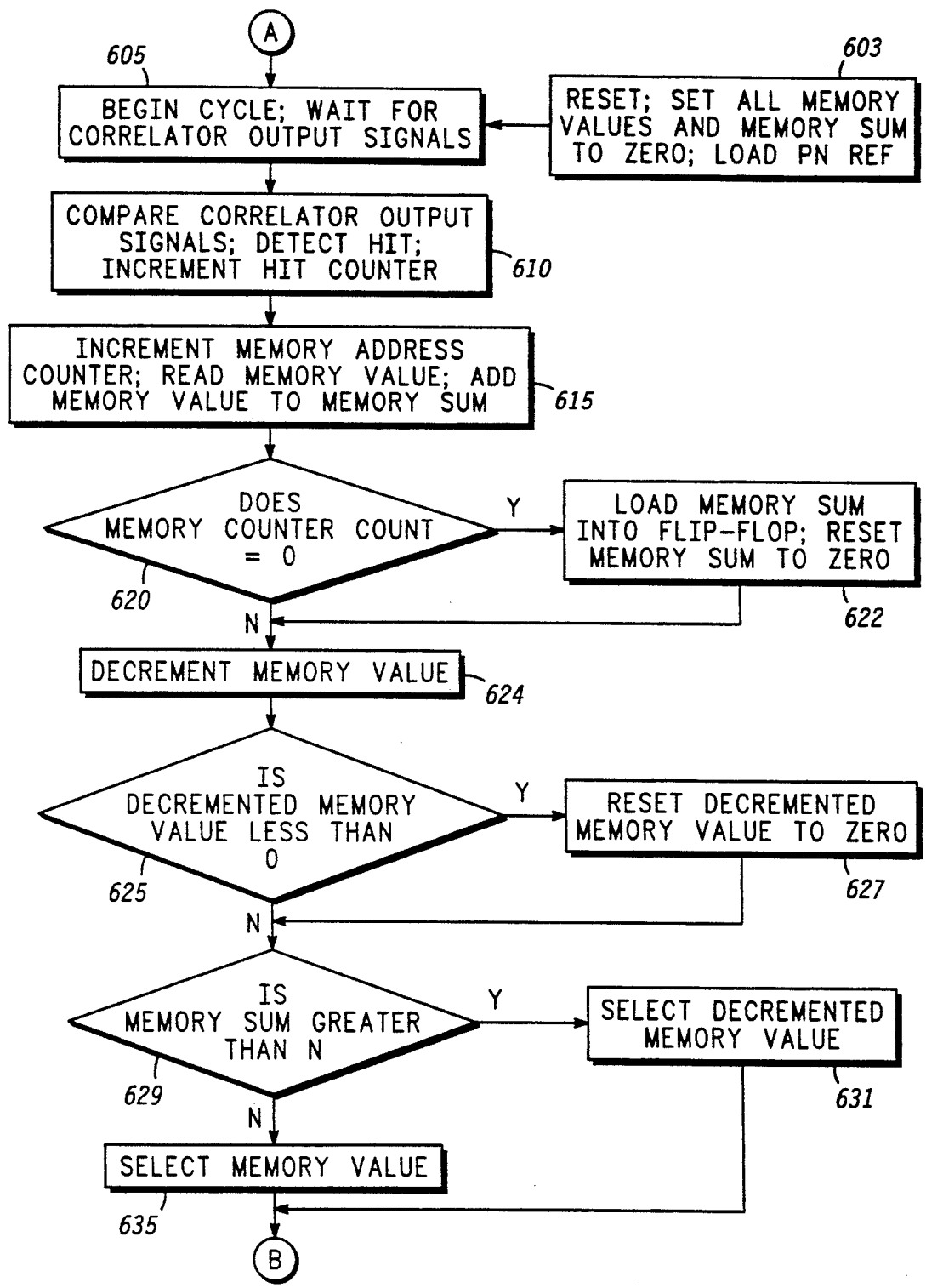
FIG. 6 is a flow diagram of a method for post-correlation scoring in accordance with the present invention.
Figure 7:
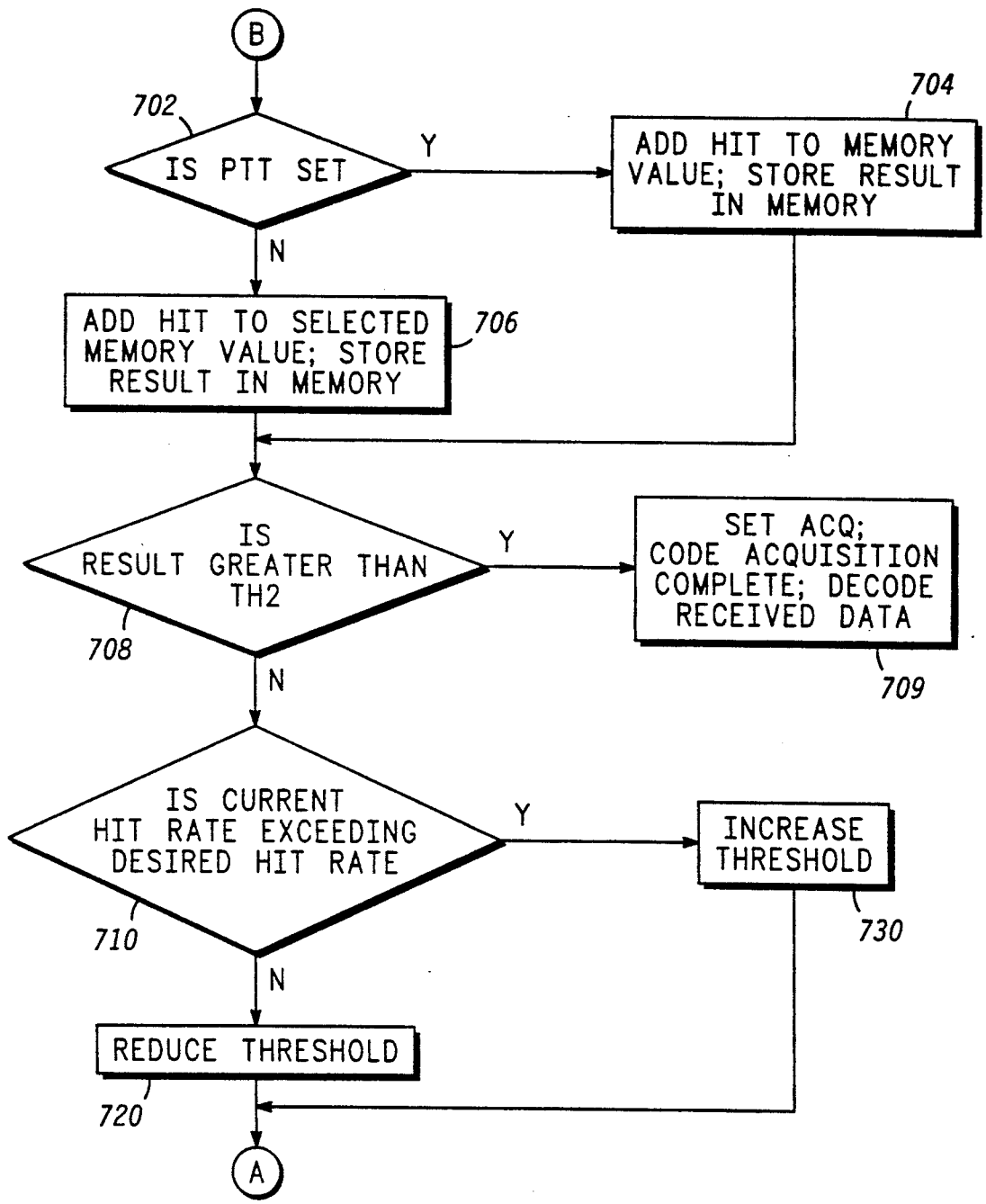
FIG. 7 is a flow diagram of a method for adjusting a threshold signal in accordance with the present invention.

FIGS. 6 and 7 depict a flow diagram of a method for post-correlation scoring and code phase acquisition in accordance with the present invention. Initially, the method begins (block 603) with a reset command, resetting of all memory values and the memory sum (or running total) to zero. A new PN reference code may be loaded at this time. The step of waiting for and obtaining (block 605) a set of correlation output signals follows the reset step and also occurs on subsequent iterations of the method (blocks 605–730). A reset command may occur during any of the steps (blocks 603–730) of the method.

When correlator output signals are present, these signals are compared to a first threshold value to find "hits" or signals whose correlation provided a correlation value exceeding the first threshold value. When a "hit" occurs, a hit counter (420 of FIG. 4, for example) is incremented (block 610).

During each acquisition cycle of the method, a memory address counter (counter 243 of FIG. 2, for example) is incremented (block 615), to allow a unique memory address for each section or chip of the code. The memory address counter count is compared to zero (block 620). If the memory address counter count is zero, the total of the data in memory is stored (by loading it into flip-flop 280 of FIG. 2, for example) and the memory sum (stored in flip-flop 275 of FIG. 2, for example) is reset to zero (block 622).

Following this or if the memory address counter count is nonzero, control passes to block 624. The value from the memory cell selected by the memory address counter count is decremented (block 624). The decremented value (block 624) is tested (block 625) to see if the decremented value is less than zero.

If the decremented value is less than zero, control passes to block 627 and zero is substituted for the decremented value (by comparator 260 and MUX 288 of FIG. 2, for example) to provide a non-negative decremented memory value. Control then passes to block 629 and the memory sum is tested to determine if it is greater than N.

If the decremented value is not less than zero, the decremented value is used as the non-negative decremented memory value. Control then passes to block 629 and the memory sum is tested to determine if it is greater than N.

If the memory sum (the running total, for example, from flip-flop 275 of FIG. 2) is greater than N, the decremented value or zero (blocks 624–627) is selected (block 631); if the memory sum is not greater than N, the value from the memory cell is selected (block 635). Control then passes via B to block 702 of FIG. 7.

A decision is made (block 702) to add the "hit" to the value from the memory cell if PTT is set (block 704), or to add the "hit" to the selected value from blocks 624–627 (block 706) if PTT is not set. Following execution of the steps of either blocks 704 or 706, control passes to block 708. The result from blocks 702–706 is tested in block 708 to determine whether this result exceeds a second threshold value (TH2). When the result exceeds the second threshold value (TH2) code phase acquisition is declared. Following code phase acquisition, the ACQ flag is set and the method for acquiring the received code phase is terminated. Data are then decoded from the received signal (block 709).

If the result does not exceed the second threshold value (TH2), the current hit rate is tested to determine if the current hit rate exceeds the desired hit rate (block 710). If the current hit rate does not exceed the desired hit rate, the first threshold value (TH1) is decreased (block 720) and the method returns to block 605 via A. If the current hit rate exceeds the desired hit rate, the first threshold value (TH1) is increased (block 730) and the method again returns to block 605 via A.

Figure 8:
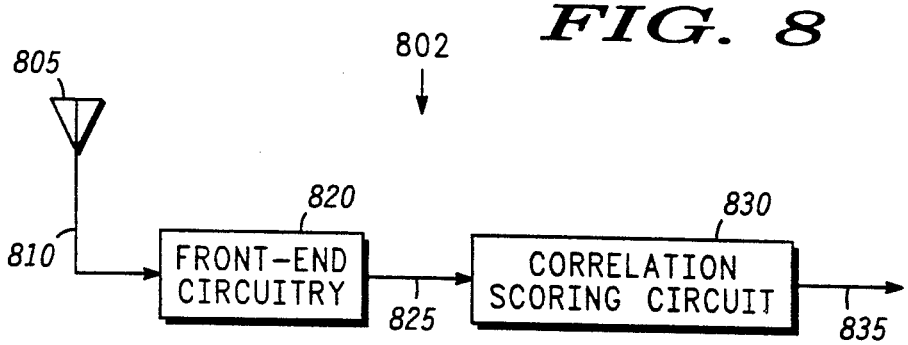
FIG. 8 is a schematic diagram of a radio receiver incorporating a correlator scoring circuit in accordance with the present invention.

FIG. 8 is a schematic diagram of radio receiver 802 incorporating correlator scoring circuit 830 in accordance with the present invention. Radio receiver 802 comprises antenna 805, antenna lead-in 810, front-end circuitry 820, baseband signal link 825, correlation circuitry 830 and correlation output 835.

Signals received by antenna 805 are applied to front-end circuitry 820. Front-end circuit 820 converts signals from antenna 805 to baseband signals, which are applied to correlation circuitry 830 via baseband signal lead 825. Correlation circuitry 830 correlates the baseband signals with a reference code to provide correlation output signals via lead 835, which couples correlation circuitry 830 to external circuitry (not shown).

Examples of apparatus usefully employing radio receiver 802 include global positioning system receivers, geostar receivers, low probability of intercept receivers and the like.

Thus, a method and apparatus for post-correlation scoring has been described which overcomes problems associated with low signal-to-noise ratio causing imperfect correlation and accomplishes certain advantages relative to prior art methods and mechanisms. The improvements over known technology are significant. The method and apparatus function in either a continuous or in a push-to-talk mode to provide correlation of a received signal with a locally generated reference code sequence.

Thus, there has also been provided, in accordance with an embodiment of the invention, a method and apparatus that fully satisfies the aims and advantages set forth above. While the invention has been described in conjunction with a specific embodiment, many alternatives, modifications and variations will be apparent to those of ordinary skill in the art in light of the foregoing description. Accordingly, the invention is intended to embrace all such alternatives, modifications and variations as fall within the spirit and broad scope of the appended claims.

We claim:

1. A method for post correlation scoring comprising the steps of:

initializing a code phase counter and a memory coupled to the code phase counter by storing zeroes therein;

providing a plurality of correlator output signals;

selecting a correlator output signal from among those of the plurality of correlator output signals indicating correlation as a selected correlator output signal by comparing the plurality of correlator output signals in an OR gate;

adding the selected correlator output signal to data stored in the memory at a memory location corresponding to a predetermined code phase, to form a post correlation signal stored in the memory at the memory location corresponding to the predetermined code phase; and scoring the post correlation signal by comparing the post correlation signal to a predetermined reference value to determine whether the post correlation signal is greater than the predetermined value and thus comprises a post correlation score.

2. A method as claimed in claim 1, further comprising steps of:

incrementing said code phase counter;

repeating said steps of providing, selecting, adding, storing, scoring and incrementing until a post correlation score is obtained; and decoding information from the plurality of correlator output signals when a post correlation score is obtained.

3. A method as claimed in claim 2, wherein said providing step includes steps of:

counting a number of correlator output signals exceeding a first threshold value; and adjusting the first threshold value to a new first threshold value.

4. A method as claimed in claim 3, wherein there are further included steps of:

comparing the counted number of correlator output signals to a predetermined value to provide an increment/decrement signal; and adjusting the first threshold value in response to the increment/decrement signal.

5. A method as claimed in claim 4, wherein adjusting the first threshold value in response to the increment/decrement signal includes steps of:

increasing the first threshold value, if a rate of correlator output signals exceeding the first threshold value is greater than a first predetermined rate; and decreasing the first threshold value, if the rate of correlator output signals exceeding the first threshold value is smaller than a second predetermined rate.

6. A method as claimed in claim 1, wherein there is further included a second adding step comprising adding post correlation signals stored in the memory to form a running total.

7. A method as claimed in claim 6, wherein said second adding step comprises steps of:

comparing the running total to a predetermined number;

decrementing all post correlation signals stored in the memory, if the running total exceeds the predetermined number, to form decremented post correlation signals;

determining whether any of the decremented post correlation signals are negative; and replacing any negative decremented post correlation signals by zero.

8. A method as claimed in claim 3, wherein said scoring step comprises steps of:

determining whether the post correlation signals exceed a second threshold; and indicating those of the post correlation signals which exceed the second threshold to comprise a post correlation score.

9. An apparatus as claimed in claim 8, further comprising a constant hit rate circuit coupled to said selection means, said constant hit rate circuit for receiving said selected correlator output signal.

10. An apparatus as claimed in claim 9, wherein said constant hit rate circuit comprises:

third comparator means coupled to said first adder means, said third comparator means for comparing a second threshold value to said post correlation total;

second counter means coupled to said selection means, said second counter means counting a number of times said selected correlator output signal exceeds a first threshold value, said second counter means being reset at predetermined intervals by a reset signal;

fourth comparator means coupled to an output of said second counter means, said fourth comparator means for comparing a third predetermined number to an output signal from said output of said second counter means;

first up/down counter means coupled to said fourth comparator means, said first up/down counter means providing said second threshold value to said third comparator means, said first up/down counter means for incrementing and decrementing said second threshold value in response to signals from said fourth comparator means; and second up/down counter means coupled to said fourth comparator means, said second up/down counter means providing said first threshold value to said plurality of correlators, said second up/down counter means for incrementing and decrementing said first threshold value in response to signals from said fourth comparator means.

11. An apparatus for post-correlation signal processing, comprising:

a plurality of correlators for correlating a received signal with a predetermined signal to produce a plurality of correlator output signals;

selection means coupled to said plurality of correlators, said selection means for selecting one of said plurality of correlator output signals to provide a selected correlator output signal;

a memory coupled to said selection means, said memory for storing a post correlation total, said post correlation total formed by adding said selected correlator output signal to a value stored in said memory;

first counter means coupled to said memory, said first counter means for synchronizing said memory with said predetermined signal;

first adder means coupled to said memory and to said selection means, said first adder means for combining said selected correlator output signal with said post correlation total from said memory to form a new post correlation total; and wherein said post correlation total is replaced in said memory with said new post correlation total.

12. An apparatus as claimed in claim 11, further including a leaky integrator, said leaky integrator including:
- second adder means coupled to said memory, said second adder means for receiving a post correlation total from said memory;
- latch means coupled to said second adder means, said latch means for storing an output signal from said second adder means;
- said second adder means for adding a stored signal from said latch means to said post correlation total from said memory to form a running total of post correlation totals, said running total of post correlation totals being stored in said memory; and
- first comparator means coupled to said latch means, said first comparator means for determining whether said running total of post correlation totals stored in said memory exceeds a first predetermined number.

13. An apparatus as claimed in claim 12, wherein said leaky integrator further includes:
- third adder means coupled to said memory, said third adder means for subtracting a second predetermined number from said post correlation total to provide a decremented value; and
- second comparator means coupled to said third adder means and to said first comparator means, said second comparator means for selecting either said decremented value, if said decremented value is greater than zero or selecting zero, if said decremented value is less than zero, to provide a decremented memory value.

14. An apparatus as claimed in claim 13, wherein said leaky integrator further includes;
- selecting means coupled to said second comparator means and to said first adder means, said selecting means for selecting said decremented memory value as a revised post correlation total, if said running total of post correlation totals is greater than a number of memory locations of said memory; or
- said selecting means selecting said post correlation total as a revised post correlation total, if said running total of post correlation totals stored in said memory is less than said number of memory locations of aid memory; and
- said first adder means adding said revised post correlation total to said selected correlator output signal.

15. An apparatus as claimed in claim 11, said apparatus further comprising toggling means for toggling said leaky integrator on and off in response to a push-to-talk signal.

16. A radio including an apparatus for post-correlation signal processing, said radio comprising:
- an antenna for receiving input signals;
- front end circuitry coupled to said antenna, said front end circuitry for converting said input signals from analog radio frequency signals to baseband digital signals;
- correlation circuitry coupled to said front end circuitry, said correlation circuitry including a post correlation signal processor, sad post correlation signal processor further comprising:
  - a plurality of correlators for correlating said baseband digital signals with a predetermined code and providing a plurality of correlator output signals;
  - selection means coupled to said plurality of correlators, said selection means for selecting a correlator output signal from one of said plurality of correlator output signals and providing a selected correlator output signal;
  - a memory coupled to said selection means, said memory for storing data including said selected correlator output signal;
  - first counter means coupled to said memory, said first counter means for synchronizing said memory with said predetermined code; and
  - first adder means coupled to said memory and to said selection means, said first adder means for combining said selected correlator output signal with said data to form a post correlation total.

17. A radio including the apparatus claimed in claim 16, further comprising a leaky integrator.

18. A radio including the apparatus claimed in claim 17, wherein said leaky integrator includes:
- second adder means coupled to said memory, said second adder means for receiving stored data from said memory;
- latch means coupled to said second adder means, said latch means for storing an output signal from said second adder means;
- said second adder means adding a stored signal from said latch means to said stored data to form a running total of data, wherein said running total of data is stored in said memory;
- first comparator means coupled to said latch means, said first comparator means for determining whether said running total of data stored in said memory exceeds a first predetermined number;
- third adder means coupled to said memory, said third adder means for subtracting a second predetermined number from said data to provide a decremented value;
- second comparator means coupled to said third adder means and to said first comparator means, said second comparator means for selecting either said decremented value, if said decremented value is greater than zero or selecting zero, if said decremented value is less than zero, to provide a decremented memory value;
- selecting means coupled to said second comparator means, to said memory and to said first adder means, said selecting means for selecting one of said decremented memory value and said data stored in said memory as revised data;
- said first adder means combining said revised data with said selected correlator output signal to form said post correlation total; and
- toggling means coupled to said leaky integrator, said toggling means for toggling said leaky integrator on and off in response to a push-to-talk signal.

19. A radio including the apparatus claimed in claim 16, including a constant hit rate circuit coupled to said memory, said constant hit rate circuit for measuring a rate of said selected correlator output signal and adjusting a first threshold signal in response to said rate of said selected correlator output signal.

20. A radio including the apparatus claimed in claim 19, wherein said constant hit rate circuit comprises:
- third comparator means coupled to said first adder means, said third comparator means for comparing a second threshold value to said post correlation total;

second counter means coupled to said selection means, said second counter means counting a number of times said selected correlator output signal exceeds a first threshold value, said second counter means being reset at predetermined intervals by a reset signal;

fourth comparator means coupled to an output of said second counter means, said fourth comparator means for comparing a third predetermined number to an output signal from said output of said second counter means;

first up/down counter means coupled to said fourth comparator means, said first up/down counter means providing said second threshold value to said third comparator means, said first up/down counter means for incrementing and decrementing said second threshold value in response to signals from said fourth comparator means; and second up/down counter means coupled to said fourth comparator means, said second up/down counter means providing said first threshold value to said plurality of correlators, said second up/down counter means for incrementing and decrementing said first threshold value in response to signals from said fourth comparator means.

* * * * *